United States Patent [19]
Johnson et al.

[11] Patent Number: 5,845,101
[45] Date of Patent: Dec. 1, 1998

[54] PREFETCH BUFFER FOR STORING INSTRUCTIONS PRIOR TO PLACING THE INSTRUCTIONS IN AN INSTRUCTION CACHE

[75] Inventors: William M. Johnson; Thang M. Tran; Matt T. Gavin; Mike Pedneau, all of Austin, Tex.

[73] Assignee: Advanced Micro Devices, Inc., Sunnyvale, Calif.

[21] Appl. No.: 855,099

[22] Filed: May 13, 1997

[51] Int. Cl.⁶ ........................................... G06F 9/30
[52] U.S. Cl. ........................ 395/383; 395/389; 711/125
[58] Field of Search .................... 395/383, 389, 395/584, 585, 352; 711/125

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |
| 5,129,067 | 7/1992 | Johnson | 395/389 |
| 5,136,697 | 8/1992 | Johnson | 395/586 |
| 5,226,126 | 7/1993 | McFarland et al. | 395/394 |
| 5,226,130 | 7/1993 | Favor | 395/585 |
| 5,623,615 | 4/1997 | Salem et al. | 395/585 |
| 5,651,125 | 7/1997 | Witt et al. | 395/394 |
| 5,689,672 | 11/1997 | Witt et al. | 395/389 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

*Primary Examiner*—Parshotam S. Lall
*Assistant Examiner*—Kenneth R. Coulter
*Attorney, Agent, or Firm*—Conley, Rose & Tayon, PC; B. Noel Kivlin; Lawrence J. Merkel

[57] ABSTRACT

A microprocessor is configured to speculatively fetch cache lines of instruction bytes prior to actually detecting a cache miss for the cache lines of instruction bytes. The bytes transferred from an external main memory subsystem are stored into one of several prefetch buffers. Subsequently, instruction fetches may be detected which hit the prefetch buffers. Furthermore, predecode data may be generated for the instruction bytes stored in the prefetch buffers. When a fetch hit in the prefetch buffers is detected, predecode data may be available for the instructions being fetched. The prefetch buffers may each comprise an address prefetch buffer included within an external interface unit and an instruction data prefetch buffer included within a prefetch/predecode unit. The external interface unit maintains the addresses of cache lines assigned to the prefetch buffers in the address prefetch buffers. Both the linear address and the physical address of each cache line is maintained. The prefetch/predecode unit receives instruction bytes directly from the external interface and stores the instruction bytes in the corresponding instruction data prefetch buffer.

19 Claims, 9 Drawing Sheets

PREFETCH BUFFER FOR STORING INSTRUCTIONS PRIOR TO PLACING THE INSTRUCTIONS IN AN INSTRUCTION CACHE

BACKGROUND OF THE INVENTION

1. Field of the Invention

This invention is related to the field of microprocessors and, more particularly, to prefetching and predecoding of instructions.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

In order to facilitate the location and dispatch of multiple instructions concurrently, many superscalar microprocessors employ predecoding. Predecoding refers to analyzing instruction bytes as they are fetched from main memory and stored into the instruction cache. The predecode data generated as a result of the predecoding is stored in the instruction cache as well. When the instruction bytes are fetched for dispatch into the instruction processing pipeline of the microprocessor, the predecode data is used by the instruction dispatch mechanism to identify the instructions and to aid in the routing of the instructions to particular functional units.

Generally speaking, predecode data comprises one or more bits of information generated by decoding the corresponding instruction bytes upon storing the bytes into an instruction cache of a microprocessor. The predecode data varies depending upon many factors including: the nature of the instruction set defined by the microprocessor architecture employed by the microprocessor, the hardware execution units included in the microprocessor, etc. As a general rule, predecode data is generated to allow quick determination of a relevant characteristic of the instruction bytes being fetched where determining that characteristic from examining the bytes themselves may require a substantially longer period of time. The amount of time required to determine the characteristic may be so long that a certain clock cycle time or frequency for the microprocessor may be unachievable without adding pipeline stages to the instruction processing pipeline of the microprocessor.

For example, a microprocessor outfitted with various execution units which execute different subsets of the instruction set may need to quickly determine which subset a particular instruction belongs to in order to route the instruction to an appropriate execution unit. The predecode data for such an example may include an indication of the subset including the instruction, allowing the instruction dispatcher to identify an appropriate execution unit. In another example, a variable length instruction set (in which different instructions and operand options occupy different numbers of bytes) may be employed by the microprocessor. The x86 instruction set is an exemplary variable length instruction set in which instructions may be between 1 and 15 bytes. In such a microprocessor, it is difficult to concurrently locate multiple instructions since the length of each instruction varies and is not determined until the instruction is at least partially decoded. Predecode data in this case may include indications of instruction boundaries, such that a set of bytes forming an instruction may be quickly located and routed to an execution unit.

Unfortunately, for many of the same reasons that make predecoding desirable, the process of performing predecoding may be quite slow. During the predecoding, events may occur which cause the predecoding to be abandoned. For example, a branch misprediction may occur causing instruction fetch to begin at a new address. If predecoding of the instructions at the new address is required, the predecoder may abandon predecoding of the instructions. Alternatively, a branch instruction may be detected within the instructions being predecoded. If the branch prediction mechanism employed by the microprocessor predicts the branch taken, then the predecoder may predecode instructions at the predicted target address of the branch instruction instead of completing predecode of the current instruction cache line. In such a case, the incomplete set of predecode data may be stored into the instruction cache. If the instruction bytes which were not predecoded are later fetched, then the predecoder must predecode the instructions at that time. In many cases, the instructions subsequent to the predicted branch instruction will be executed. For example, if the predicted branch instruction is a subroutine call instruction, then the subsequent instructions will generally be executed upon return from the subroutine.

In either of the examples of predecode interruption given above, as well as others, predecode occurs at a later time when the instructions are needed in the instruction processing pipeline. Performance of the microprocessor may suffer as the instruction processing pipeline awaits the results of the predecoding. Furthermore, the time elapsing for fetching the bytes from external memory is quite large in many cases. Performance of the microprocessor may suffer as the instruction processing pipeline endures these delays as well.

SUMMARY OF THE INVENTION

The problems outlined above are in large part solved by a microprocessor employing prefetch buffers in accordance with the present invention. The microprocessor is configured to speculatively fetch cache lines of instruction bytes prior to actually detecting a cache miss for the cache lines of instruction bytes. The bytes transferred from an external main memory subsystem are stored into one of the prefetch buffers. Subsequently, instruction fetches may be detected which hit the prefetch buffers. Instead of requiring transfer of the instruction bytes from main memory, the bytes may be stored in the prefetch buffers. Furthermore, predecode data may be generated for the instruction bytes stored in the prefetch buffers. When a fetch hit in the prefetch buffers is detected, predecode data may be available for the instructions being fetched. Delays associated with predecoding the instruction bytes may therefore be avoided when the instruction bytes are actually fetched.

In one embodiment, the prefetch buffers each comprise an address prefetch buffer included within an external interface unit and an instruction data prefetch buffer included within a prefetch/predecode unit. The external interface unit maintains the addresses of cache lines assigned to the prefetch buffers in the address prefetch buffers. Both the linear address and the physical address of each cache line is maintained. The instruction cache is linearly addressed, and so the linear address is compared to the fetch addresses to detect hits in the prefetch buffer. The physical address is used to detect aliases between different linear addresses which translate to the same physical address. The prefetch/predecode unit receives instruction bytes directly from the external interface and stores the instruction bytes in the corresponding instruction data prefetch buffer.

Broadly speaking, the present invention contemplates an instruction buffer for storing instructions prior to their storage in an instruction cache of a microprocessor. The instruction buffer comprises an address buffer, an instruction data buffer, and a control unit. The address buffer is configured to store an address corresponding to a plurality of instruction bytes. The instruction data buffer is configured to store the plurality of instruction bytes and is coupled to receive the plurality of instruction bytes from a source external to the microprocessor. Coupled to the instruction data buffer, the control unit is configured to retain the plurality of instruction bytes within the instruction data buffer if an instruction fetching mechanism within the microprocessor initiates an instruction fetch for a second address dissimilar from the address stored in the address buffer.

The present invention further contemplates a method for prefetching. An address which misses an instruction cache is stored in an address buffer. An external request is initiated for instruction bytes stored at the address. The instruction bytes are received into an instruction data buffer and predecoded. Additionally, the instruction bytes are retained in the instruction data buffer until completion of the predecoding, even if the predecoding is interrupted.

The present invention still further contemplates a microprocessor comprising an instruction cache and a prefetch/predecode unit. The instruction cache is configured to store instructions. Coupled to receive a plurality of instruction bytes from an external source in response to a fetch miss in the instruction cache, the prefetch/predecode unit is configured to retain the plurality of instruction bytes if the instruction cache fetches an address indicative of another plurality of instruction bytes.

BRIEF DESCRIPTION OF THE DRAWINGS

Other objects and advantages of the invention will become apparent upon reading the following detailed description and upon reference to the accompanying drawings in which.

Figure 1:
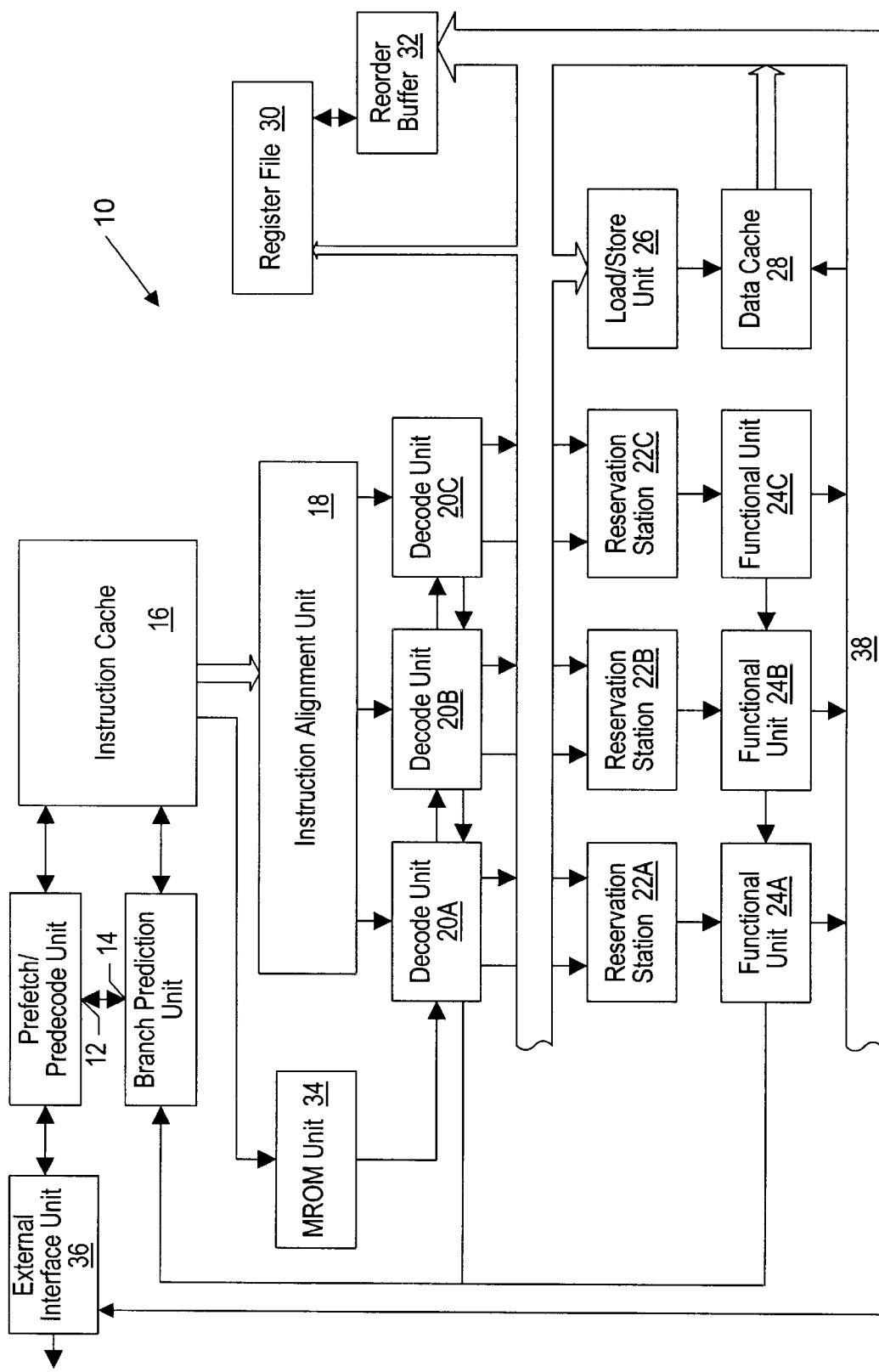
FIG. 1 is a block diagram of one embodiment of a superscalar microprocessor including an external interface unit and a prefetch/predecode unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and an external interface unit 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from external interface unit 36, which communicates with an external main memory subsystem (not shown). Prefetch/predecode unit 12 is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to external interface unit 36. Finally, MROM unit 34 is coupled to decode units 20.

Generally speaking, prefetch/predecode unit 12 is configured to store instruction bytes received from external interface unit 36 in a prefetch buffer included therein. Prefetch/predecode unit 12 predecodes the received instruction bytes. If predecoding of the received instruction bytes is interrupted, the instruction bytes are retained within the prefetch buffer. The predecode logic may continue predecoding at a later clock cycle after completing predecode of instruction bytes for which the predecode was interrupted. Upon completion of the predecode, the instructions and the corresponding predecode data are stored into the instruction cache. Advantageously, predecoding of instructions not immediately dispatched into the instruction processing pipeline of microprocessor 10 may be completed at a time when the instructions are not immediately needed by the instruction processing pipeline. If the instructions are subsequently fetched by microprocessor 10, the predecode data may thereby be available, allowing the instructions to proceed into the instruction processing pipeline without predecoding delay.

Instruction cache 16 conveys the instruction address which is being fetched from the instruction cache concurrent with performing the instruction fetch. If the instructions are stored in the prefetch buffer, the instructions are forwarded from the prefetch buffer to instruction cache 16 and further to the predecode logic if predecoding is needed. Instruction cache 16 stores the instructions (and corresponding prefetch data), and fetches the instructions therefrom in a subsequent clock cycle. Because the prefetch buffers are searched concurrent with instruction cache 16, information regarding hitting in the prefetch buffers is available at substantially the same time (e.g. in the same clock cycle) as cache hit information from instruction cache 16. In one embodiment, the prefetch buffers comprise address prefetch buffers within external interface unit 36 and corresponding instruction data prefetch buffers within prefetch/predecode unit 12. External interface unit 36 maintains the addresses of instruction bytes stored in the prefetch buffers in the address prefetch buffers. The fetch addresses are conveyed to external interface unit 36, which determines if instruction bytes corresponding to the address are stored in the prefetch buffer. If so, external interface unit 36 informs prefetch/predecode unit 12 so that prefetch/predecode unit 12 conveys the corresponding instruction bytes from the instruction data prefetch buffers to instruction cache 16.

In one embodiment, the prefetch buffer is configured to store up to 4 different cache lines of instruction bytes. When all 4 cache lines are occupied and an instruction cache miss is detected, the cache line which has resided in the prefetch buffer for the longest period (i.e. the oldest cache line stored therein) is discarded in favor of the detected cache miss. Predecode data for each cache line is also stored, as well as an indication of the byte within the cache line at which predecoding was halted. The predecode logic within prefetch/predecode unit 12 may use the indication to continue predecoding a partially predecoded cache line. In one embodiment, the predecode logic examines the indication upon detection of an instruction fetch hit in the prefetch buffers in order to continue predecoding. If the indication is subsequent to the byte indicated by the fetch address, then the predecode logic begins predecoding at the indicated byte. Otherwise, the predecode logic begins predecoding at the byte indicated by the fetch address.

It is noted that, in the embodiment shown, instruction cache 16 is linearly addressed. Generally, a cache stores information in units of cache lines, which comprise a plurality of contiguous bytes from main memory. Each cache line includes a tag which identifies the contiguous bytes. The tag is compared to a similar portion of the address used to access the cache. If a tag matches the address, a cache hit is determined and the bytes corresponding to the tag are conveyed to the instruction processing pipeline. If a tag does not match the address, a cache miss is determined and the bytes must be fetched from main memory. As used herein, the term "match", when used in conjunction with comparing addresses, means that the two addresses being compared lie within the same cache line.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

Start bits 10000
End bits 00001
Functional bits 11000

MROM instructions are instructions which are determined to be too complex for decode by decode units 20.

MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags are included in external interface unit 36 for mapping the linear addresses to physical addresses and for detecting translation aliases. Additionally, external interface unit 36 may perform linear to physical address translation. External interface unit 36 further includes circuitry for interfacing within an external main memory subsystem. For example, external interface unit 36 may provide a bus interface to which memory devices and various other peripheral devices may be attached.

Figure 2:
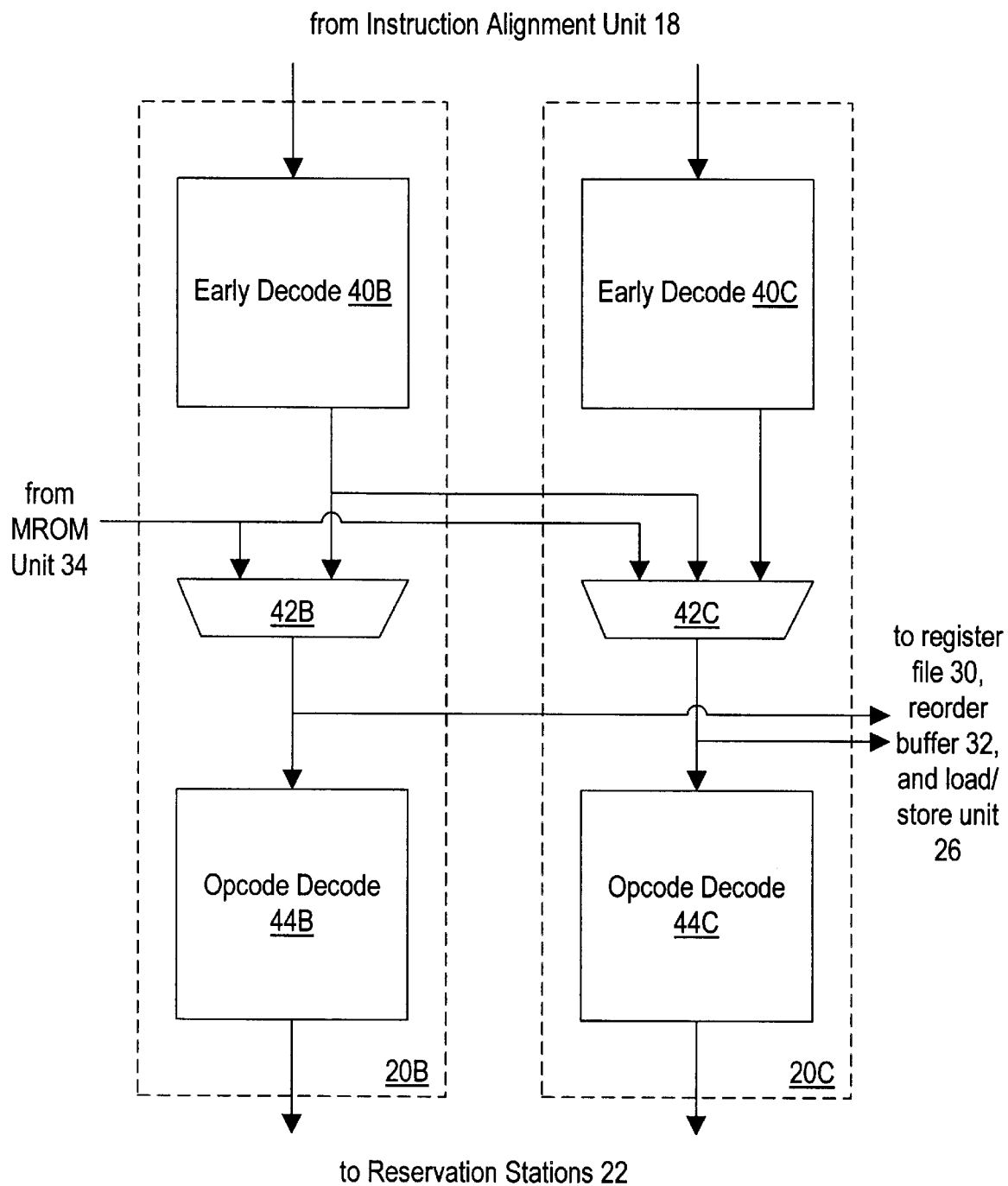
FIG. 2 is a block diagram of one embodiment of a pair of decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
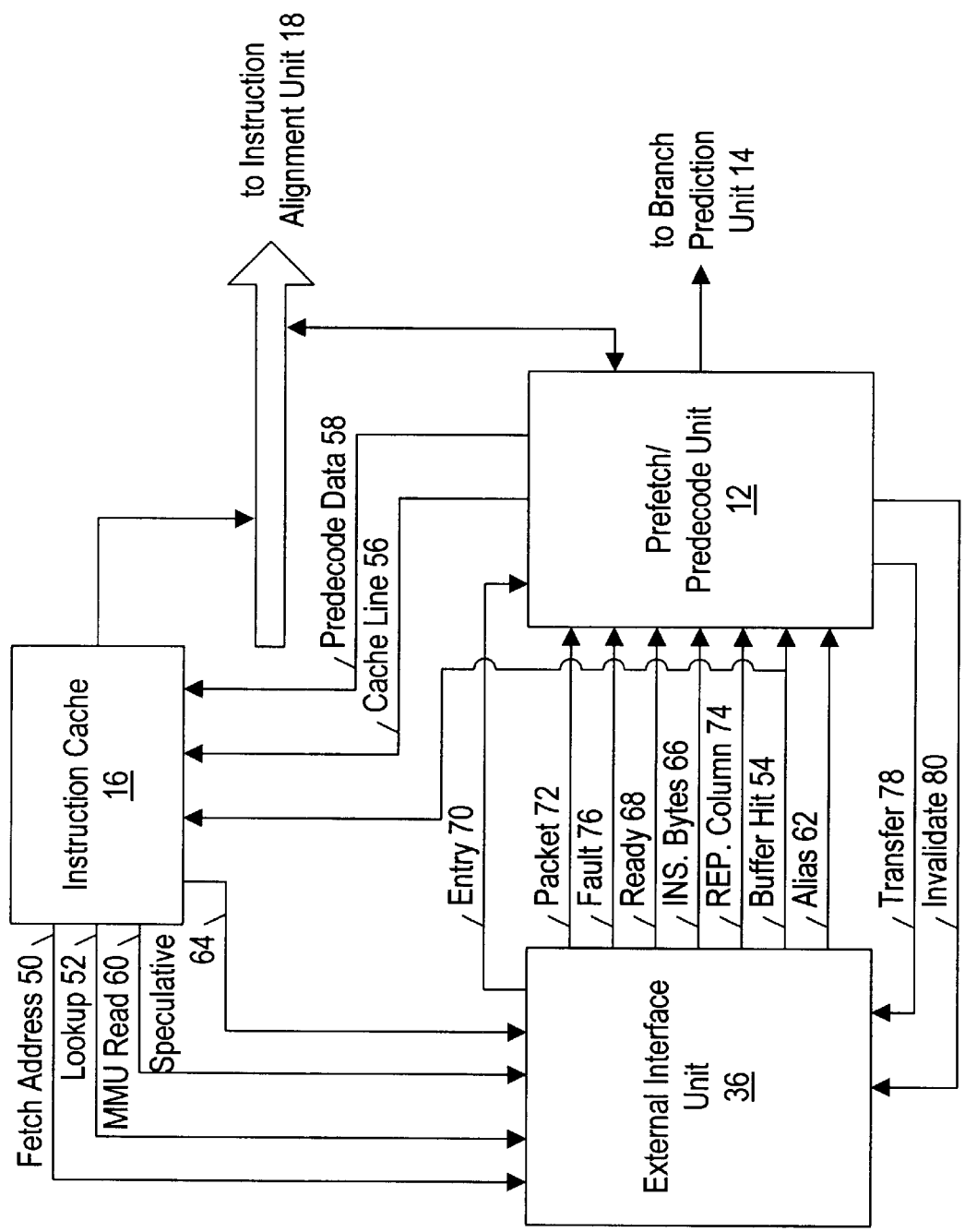
FIG. 3 is a block diagram of an instruction cache, the external interface unit, and the prefetch/predecode unit shown in FIG. 1, highlighting interconnection between the units according to one embodiment of the microprocessor.

Turning now to FIG. 3, a block diagram of instruction cache 16, prefetch/predecode unit 12, and external interface unit 36 is shown. FIG. 3 highlights interconnection between the units shown according to one embodiment of microprocessor 10. Other embodiments may include additional interconnection or may substitute other interconnection for the interconnection shown.

As instruction cache 16 searches its storage for instructions, it concurrently conveys the fetch address upon a fetch address bus 50 to external interface unit 36. Additionally, instruction cache 16 asserts a lookup signal upon a lookup line 52. The lookup signal operates as a valid indication for fetch address bus 50, indicating that instructions are being fetched from instruction cache 16 during the clock cycle in which the lookup signal is asserted. Conversely, a deasserted lookup signal indicates that instructions are not being fetched during that clock cycle. External interface unit 36 includes multiple address prefetch buffers which store the addresses of cache lines which are currently stored in the instruction data prefetch buffers within prefetch/predecode unit 12. A particular cache line may be stored therein because bytes from the cache line are being received from the external main memory subsystem, such that the complete cache line is not yet within microprocessor 10. Alternatively, the particular cache line may be in the process of being predecoded prior to storage within instruction cache 16.

If external interface unit 36 detects that a fetch address hits in the instruction data prefetch buffers within prefetch/predecode unit 12, external interface unit 36 informs prefetch/predecode unit 12 via a buffer hit bus 54. Buffer hit bus 54 further indicates which of the instruction data prefetch buffers is storing instruction bytes corresponding to the fetch address. In one embodiment, buffer hit bus 54 comprises a plurality of lines (one for each of the instruction data prefetch buffers within prefetch/predecode unit 12). Each line, when asserted, indicates that instruction cache 16 is currently fetching instruction bytes stored in the corresponding prefetch buffer. Prefetch/predecode unit 12 conveys the corresponding cache line upon cache line bus 56, and any predecode data associated therewith upon a predecode data bus 58. Because instruction cache 16 transmits the fetch address upon fetch address bus 50 concurrent with searching the instruction cache, hit indications from both the instruction cache and the prefetch buffers are available in the same clock cycle. Instruction cache 16 receives buffer hit bus 54 as well, thereby detecting that the requested instructions hit in the prefetch buffers.

There are four possible cases for hitting/missing in the cache and hitting in the prefetch buffers:

(i) Miss in the cache and predecode data is valid in the prefetch buffer. Instruction bytes and predecode data from the prefetch buffer are stored into the instruction array within instruction cache 16. Subsequently, instruction cache 16 reaccesses the instruction array for the instruction bytes and the corresponding predecode data.

(ii) Miss in the cache and predecode data is invalid in the prefetch buffer. The instruction bytes are forwarded to the predecoder from the prefetch buffer and are stored into the instruction array.

(iii) Hit in the cache and predecode data at the byte being fetched is valid in the cache. The hit in the prefetch buffer is ignored.

(iv) Hit in the cache and predecode data at the byte being fetched is invalid in the cache. The instruction bytes and prefetch data from the prefetch buffer are stored in the instruction array and the instruction cache reattempts the access.

Note that in each case, the instruction bytes stored in the prefetch buffer are stored into the corresponding storage location within the instruction array of instruction cache 16. The tag within instruction cache 16 which identifies the line may be updated to indicate valid, even if all of the instruction bytes have not yet been received from the external main memory subsystem. The prefetch buffer remains valid until at least all of the bytes are received, such that the contents of the instruction cache line will be overwritten by the complete set of bytes upon subsequent fetch of the cache line from instruction cache 16. This operation may be especially useful if a partial cache line is received and a branch instruction which is predicted taken is discovered during predecoding of the partial cache line. Instead of waiting for the entire cache line to be received, instruction cache 16 may fetch the instructions at the branch target. The prefetch buffers will subsequently receive the remainder of the cache line.

If a particular fetch address hits in either instruction cache 16 or in the prefetch buffers (as indicated by buffer hit bus 54), instruction cache 16 continues with a subsequent fetch address as generated by branch prediction unit 14. However, if the fetch address misses in both instruction cache 16 and the prefetch buffers, instruction cache 16 presents the address again upon fetch address bus 50. Additionally, the lookup signal is asserted as well as an MMU read signal upon an MMU read line 60 coupled to external interface unit 36. The MMU read signal indicates, when asserted, that a translation is requested from external interface unit 36. External interface 36 translates the fetch address to a physical address, and determines if the physical address is stored in the prefetch buffers. If the physical address is stored in the prefetch buffers (associated with a different linear address), then external interface 36 indicates the prefetch buffer storing the physical address via buffer hit bus 54. Additionally, external interface unit 36 asserts an alias signal upon an alias line 62 to prefetch/predecode unit 12. The instructions corresponding to the aliased cache line are thereby provided from the prefetch buffer.

Instruction cache 16 is further configured to speculatively fetch additional cache lines when a particular instruction fetch misses both instruction cache 16 and the prefetch buffers. In one embodiment, when the particular instruction fetch misses, a second cache line is fetched. The second cache line comprises the next sequential cache line (i.e. the fetch address which misses plus the size of the cache line in bytes). When the second cache line address is conveyed, the lookup and MMU read signals are asserted as well as a speculative signal upon a speculative line 64 coupled to external interface unit 36. The speculative signal informs external interface unit 36 that the fetch address being presented is a speculative instruction fetch. If the speculative fetch misses both instruction cache 16 and the prefetch buffers, the cache line may be fetched from the external main memory subsystem and predecode upon the fetched instruction bytes may be initiated. If the cache line is subsequently required according to the execution of instructions within the instruction stream, then the cache line may be available within the prefetch buffers. Additionally, a portion or all of the predecoding may be complete. It is noted that presenting a fetch address which is not presently needed according to the instruction stream being fetched and executed is referred to as "prefetching".

External interface unit 36 initiates a transaction to the external main memory subsystem in response to a transaction which misses both instruction cache 16 and the prefetch buffers and which is not aliased by another linear address stored in either the prefetch buffers or instruction cache 16. Additionally, external interface unit 36 selects a replacement column, or way, of instruction cache 16 for storing the cache line being fetched. Any replacement algorithm may be employed. For example, a least recently used algorithm may be employed among the ways comprising one row of instruction cache 16. Alternatively, a random selection may be made.

Subsequently, data arrives from the external main memory subsystem. Microprocessor 10 generally includes an interface which transfers data in packets, wherein a packet includes fewer bytes than an instruction cache line. Transferring the entire cache line at once may be prohibitively costly, both in pins required on the package containing microprocessor 10 and on the external main memory subsystem. In one embodiment, a cache line comprises 32 bytes and packets comprise eight bytes. Therefore, four packets are received for each cache line. External interface unit 36 transfers the received instruction bytes upon an instruction bytes bus 66 coupled to prefetch/predecode unit 12. In one embodiment, instruction bytes bus 66 originates at the driver/receiver pads for the data lines employed to transfer data from the external main memory subsystem. A ready line 68 is used to carry a ready signal indicating that instruction bytes are being transferred during a particular clock cycle. Additionally, an entry bus 70 provides an indication of the prefetch buffer which is to store the packet conveyed upon instruction bytes bus 66. In one embodiment, four prefetch buffers are employed. For this embodiment, entry bus 70 comprises a signal for each prefetch buffer which, when asserted, indicates that the prefetch buffer is the selected entry.

Similarly, a packet bus 72 indicates which of the packets is being transferred. In one embodiment, a signal upon packet bus 72 corresponds to each of the packets and indicates, when asserted, that the corresponding packet is being provided. Packets may be provided in a variety of orders, but generally the packet containing the byte identified by the low order bits of the fetch address is transferred first. In this manner, bytes which are currently needed by microprocessor 10 are transferred first, and bytes which fill out the cache line are transferred second. A replacement column bus 74 conveys the previously selected replacement column to prefetch/predecode unit 12. The replacement column is stored in the corresponding instruction data prefetch buffer for use when the instructions are stored into instruction cache 16.

When prefetch/predecode unit 12 transmits instructions and predecode data to instruction cache 16 for storage, prefetch/predecode unit 12 also informs external interface unit 36 that the transfer is occurring via a transfer bus 78. In one embodiment, transfer bus 78 includes a signal for each prefetch buffer indicative, when asserted, that the prefetch buffer is being stored into instruction cache 16. External interface unit 36 updates the physical tags included therein to indicate that instruction cache 16 now includes a copy of the cache line previously stored in the indicated prefetch buffer.

In one embodiment, the interface to the external main memory subsystem (e.g. a bus) includes the ability to indicate an error in a particular data packet. External interface unit 36 conveys any detected errors upon a fault line 76 to prefetch/predecode unit 12 concurrent with transmitted packets of data received when the error is detected. Prefetch/ predecode unit 12 notes the detected error, and indicates the detected error to instruction cache 16. Instruction cache 16 invalidates the affected cache line. Additionally, an invalidate signal upon an invalidate line 80 is conveyed concurrent with assertion of the corresponding signal upon transfer bus 78. External interface unit 36 invalidates the corresponding entry in the physical tags, indicating that instruction cache 16 does not store a valid cache line in the selected entry.

A path from prefetch/predecode unit 12 to branch prediction unit 14 is shown in FIG. 3. As noted above, prefetch/ predecode unit 12 detects branch instructions within the instructions being predecoded and generates branch prediction information therefor. The information is conveyed to branch prediction unit 14, which stores the branch prediction information such that a subsequent fetch of the corresponding cache line causes the branch prediction information to be accessed. The information may be subsequently updated in accordance with actual execution of the instructions in the cache line.

Figure 4:
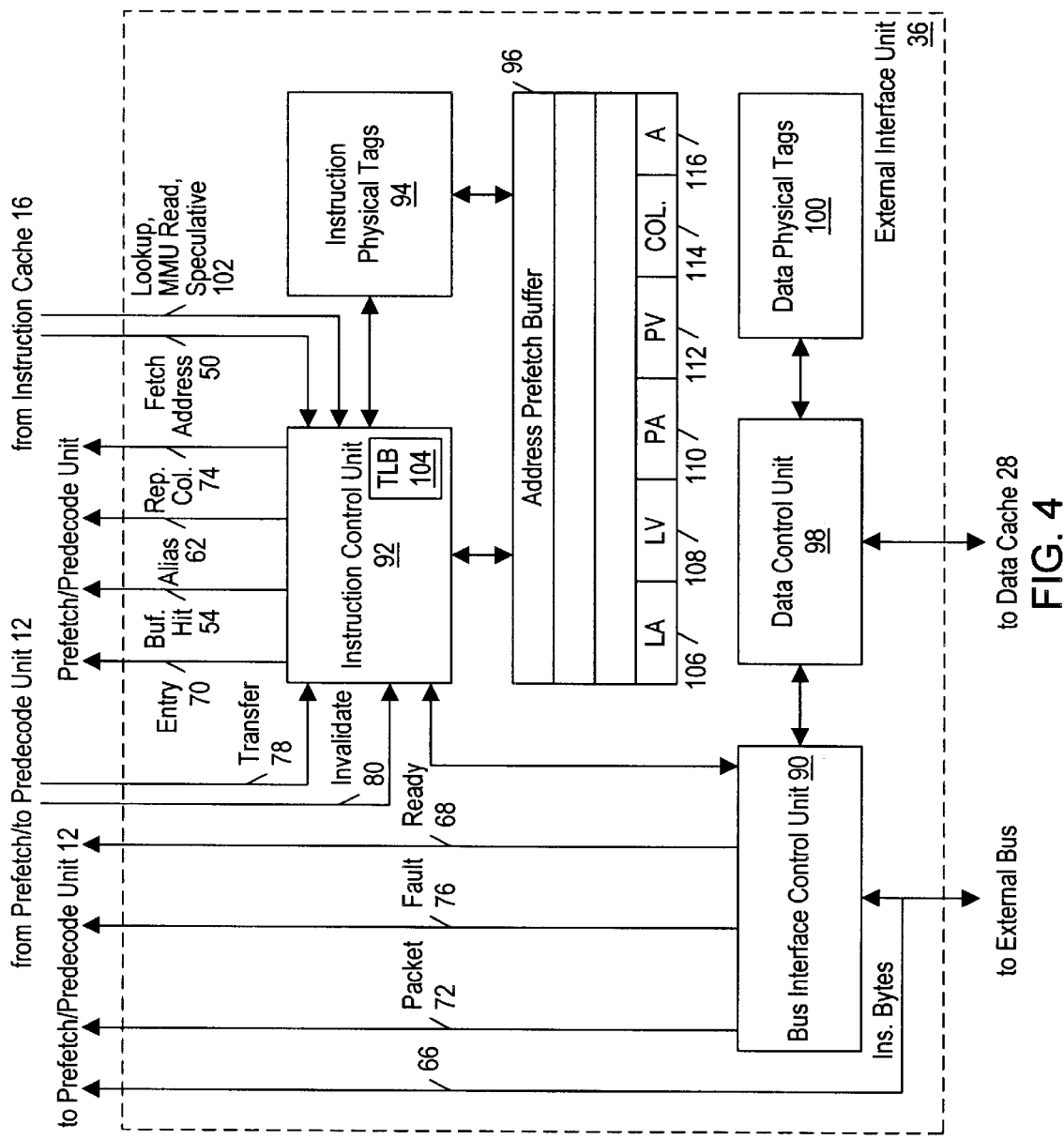
FIG. 4 is a block diagram of one embodiment of the external interface unit shown in FIG. 3.

Turning now to FIG. 4, a block diagram of one embodiment of external interface unit 36 is shown. Other embodiments are contemplated. As shown in FIG. 4, external interface unit 36 includes a bus interface control unit 90, an instruction control unit 92, an instruction physical tags storage 94, a set of address prefetch buffers 96, a data control unit 98, and a data physical tags storage 100. Bus interface control unit 90 is coupled to instruction control unit 92, data control unit 98, and the external interface of microprocessor 10 (not shown). Instruction control unit 92 is further coupled to address prefetch buffers 96 and instruction physical tags storage 94. Instruction physical tags 94 is further coupled to address prefetch buffers 96. Data control unit 98 is coupled to data cache 28 and data physical tags 100.

Bus interface control unit 90 effects communications between microprocessor 10 and other devices (such as an external main memory system) coupled thereto. Bus interface control unit 90 initiates transfers from the main memory system in response to instruction cache misses indicated by instruction control unit 92. Furthermore, transfers are effected in response to data cache misses indicated by data control unit 98. Additionally, a transfer is initiated in response to a write back of data which was modified in data cache 28 and the modified cache line is being replaced.

Bus interface control unit 90 manages the flow of data to and from microprocessor 10. Therefore, bus interface control unit 90 provides the flow control signals for transferring data packets to prefetch/predecode unit 12, as shown in FIG. 4. As noted above, instruction bytes bus 66 originates directly from the driver/receiver pads corresponding to the data lines of the external interface employed by microprocessor 10. In FIG. 4, therefore, instruction bytes bus 66 is shown coming directly from the external interface.

Instruction control unit 92 interfaces with instruction cache 16 and prefetch/predecode unit 12 in order to transfer cache lines of instructions being fetched and executed by microprocessor 10 into instruction cache 16. Furthermore, instruction control unit 92 manages address prefetch buffers 96 and instruction physical tags storage 94. When instruction control unit 92 receives a fetch address upon fetch address bus 50, the lookup signal is asserted, and the MMU read signal is not asserted, instruction control unit 92 compares the fetch address to the addresses stored in address prefetch buffers 96. More particularly, the linear address stored in each address prefetch buffer which is storing an indication of a cache line being prefetched is compared to the fetch address. If a match is detected, instruction control unit 92 asserts the corresponding buffer hit signal upon buffer hit bus 54. It is noted that the lookup signal, the MMU read signal, and the speculative signal are depicted in FIG. 4 as a single line (reference number 102).

Alternatively, instruction control unit 92 may receive a fetch address for which the MMU read signal is asserted. In this case, instruction control unit 92 searches a translation lookaside buffer (TLB) 104 included therein for a translation from the linear fetch address to a physical address. If the translation is not stored in TLB 104, then instruction control unit 92 searches the translation tables stored in the main memory system for a translation of the fetch address. In one embodiment, instruction control unit 92 translates the fetch address according to the paging portion of the x86 translation mechanism. It is noted that, when a translation is not stored in TLB 104 for a particular linear address, then instruction control unit 92 causes bus interface control unit 90 to initiate transfers of data from the area of main memory allocated to storing translation tables. Upon generating a physical address via the translation mechanism, instruction control unit 92 searches the instruction physical tags storage 94 and the address prefetch buffers 96 to determine if the requested cache line is already stored in instruction cache 16 or the prefetch buffers via a different linear address (i.e. under an alias). If an alias in the prefetch buffers is detected, the alias signal upon alias line 62 is asserted. If an alias in instruction cache 16 is detected, instruction control unit 92 communicates the location of the aliased cache line to instruction cache 16 (not shown). Instruction cache 16 may then deal with the aliased cache line internally.

For cases in which an alias is not detected for a fetch address for which a translation is requested, instruction control unit 92 allocates an address prefetch buffer for storing the fetch address. Instruction control unit 92 may employ any method for selecting a prefetch buffer, but in one embodiment a least recently used algorithm is employed. Furthermore, the selected address prefetch buffer may not be a prefetch buffer which has updated instruction cache 16 with partial data and has not subsequently updated instruction cache 16 with the complete data. Instruction control unit 92 stores the linear address and corresponding physical address into the selected address prefetch buffer. Additionally, instruction control unit 92 selects a column (or way) of instruction cache 16 to store the cache line being fetched. The column selected is stored into address prefetch buffers 96 as well.

It is noted that, if the speculative signal upon speculative line 64 is asserted for a particular fetch address, instruction control unit 92 does not respond with the alias signal, even if an alias is detected. Furthermore, it is optional for instruction control unit 92 to allocate a prefetch buffer if the particular fetch address misses both instruction cache 16 and the prefetch buffers. Generally, instruction control unit 92 allocates a prefetch buffer unless all the prefetch buffers have been previously allocated and their active bits are set.

The information stored in address prefetch buffers 96 is depicted in FIG. 4 for the present embodiment. A linear address (LA) field 106 stores the linear address of the cache line being fetched. A linear valid (LV) bit 108 indicates the validity or invalidity of linear address field 106. Similarly, the physical address is stored in a physical address (PA) field 110 with a corresponding physical valid (PV) bit 112. A column field 114 stores the column of instruction cache 16 selected for storing the cache line. Finally, an active bit 116 indicates whether or not the entry is still in use (i.e. instruction cache 16 has not yet been updated with the complete cache line). Upon storage of the complete instruction cache line into instruction cache 16, the active bit may be reset. Once the active bit is reset, the prefetch buffer may be assigned to a new instruction fetch address.

Instruction control unit 92 receives transfer bus 78 and invalidate line 80 from prefetch/predecode unit 12. If invalidate line 80 is asserted along with a prefetch buffer indication upon transfer bus 78, instruction control unit 92 invalidates the corresponding entry in instruction physical tags storage 94 using the addresses stored in the indicated address prefetch buffer. Otherwise, instruction control unit 92 updates the instruction physical tags with the linear and physical addresses indicated in the address prefetch buffer identified by transfer bus 78. In this manner, instruction cache 16 and instruction physical tags 94 are updated concurrently.

Generally speaking, instruction physical tags storage 94 is configured with the same geometry (i.e. rows and columns) as instruction cache 16. Each entry stores the linear address being stored in the corresponding entry of instruction cache 16 and the physical address to which the linear address translates. Instruction cache 16 (and instruction physical tags storage 94) are indexed by certain low order bits of the fetch address which are not translated between linear and physical addresses. Therefore, if an alias exists, the row of instruction physical tags storage 94 selected by the index of the fetch address will include the alias. Instruction control unit 92 compares the translation for the fetch address to the physical addresses stored in the selected row of instruction physical tags 94 to detect aliases.

Similar to instruction control unit 92, data control unit 98 interfaces with data cache 28 and maintains data physical tags for the linear addresses stored in data cache 28. Data control unit 98 interfaces with bus interface control unit 90 to transfer data to and from data cache 28. Data physical tags storage 100 is a structure having the same geometry as data cache 28.

Figure 5:
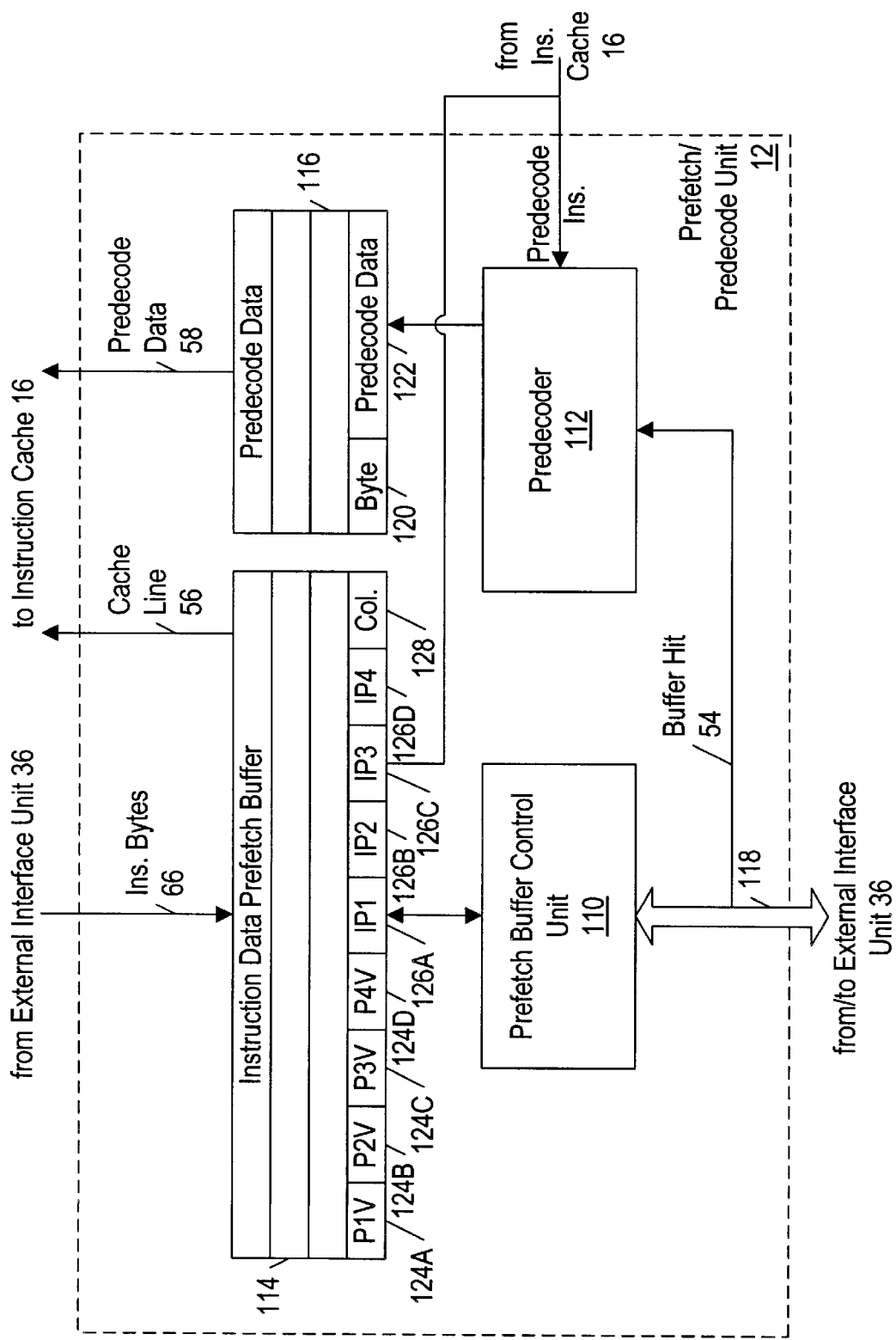
FIG. 5 is a block diagram of one embodiment of the prefetch/predecode unit shown in FIG. 3.

Turning now to FIG. 5, a block diagram of one embodiment of prefetch/predecode unit 12 is shown. Other embodiments are contemplated. As shown in FIG. 5, prefetch/predecode unit 12 includes a prefetch buffer control unit 110, a predecoder 112, a set of instruction data prefetch buffers 114, and a set of predecode data buffers 116. Prefetch buffer control unit 110 is coupled to instruction data prefetch buffer 114, and predecoder 112 is coupled to predecode data buffers 116.

Prefetch buffer control unit 110 receives and transmits the control flow signals coupled between prefetch/predecode unit 12 and external interface unit 36 (represented by a bus 118). In the embodiment shown in FIG. 3, bus 118 includes entry bus 70, packet bus 72, fault line 76, ready line 68, replacement column bus 74, buffer hit bus 54, alias line 62, transfer bus 78, and invalidate line 80. Instruction bytes bus 66 and cache line bus 56 are coupled to instruction data prefetch buffer 114. Upon receipt of an asserted ready signal upon ready line 68, the instruction data prefetch buffer entry indicated by entry bus 70 stores the instruction bytes conveyed upon instruction bytes bus 66. Packet bus 72 indicates which of the packets is being conveyed, directing the instruction bytes to the appropriate portion of the selected instruction data prefetch buffer. Upon receipt of a signal upon buffer hit bus 54, the selected instruction data prefetch buffer conveys the instruction bytes stored therein upon cache line bus 56. The predecode data stored in the corresponding predecode data buffer is conveyed upon predecode data bus 58 concurrently. Additionally, instruction bytes (and corresponding valid bits indicating which packets are valid) may be conveyed to predecoder 112 for predecoding if the predecode data in predecode data buffer 116 is invalid. The instruction bytes are conveyed to predecoder 112 upon the same bus that instruction cache 16 uses to convey instructions to instruction alignment unit 18. In one embodiment, predecoder 112 receives a portion of the cache line for predecode instead of the full cache line. For example, instead of conveying 32 bytes to predecoder 112, the 16 byte portion of the cache line including the instruction byte indicated by the fetch address is conveyed. The prefetch data may be stored into the corresponding prefetch data buffer 116. Predecoder 112 receives buffer hit bus 54 for locating the prefetch data buffer in which to store the generated predecode data.

Predecoder 112 predecodes instructions one at a time. Predecoder 112 receives the fetch address and determines the beginning of the first instruction from the least significant bits of the fetch address. Predecoder 112 makes a first attempt to predecode by assuming no prefix bytes are included in the x86 instruction (i.e. that the first byte is the opcode byte). Additionally, predecoder 112 detects any prefix bytes in parallel. If prefix bytes are detected, a second attempt to predecode is made with the opcode byte as the first byte (i.e. shifting past the prefix bytes).

If predecoder 112 is predecoding instruction bytes stored in instruction data prefetch buffers 114 and is interrupted to predecode other instructions (from instruction cache 16, for example), predecoder 112 is configured to store the generated predecode data into the predecode data buffer identified by buffer hit bus 54. Additionally, predecoder 112 stores the byte at which the next instruction to be predecoded is stored, such that predecoding may be reinitiated after the instructions which caused the interruption are predecoded.

Therefore, predecode data buffers 116 each comprise a byte field 120 and a predecode data field 122. In the present embodiment, predecode data field 122 includes storage for start, end, and functional bits for each byte within an instruction cache line. In one embodiment, predecoder 112 stops predecoding a given cache line if one of the following events is detected: a predicted taken branch is detected within the instruction bytes being predecoded, or predecoder 112 is interrupted due to the detection of invalid predecode data from instruction cache 16. If a predicted taken branch is detected, the instruction bytes and predecode data are stored into instruction cache 16. When predecoder 112 is interrupted, the above described activities occur. It is further noted that instruction fetching may begin at a different address prior to receiving all of the instruction bytes corresponding to a given instruction cache line stored in the prefetch buffers. Packets may continue to be received and stored into instruction data prefetch buffers 116.

In one embodiment, if predecoder 112 is idle and instruction bytes are stored in one of instruction data prefetch buffers 114, predecoder 112 reinitiates predecoding of instruction bytes in a particular prefetch buffer entry if a hit is detected in that prefetch buffer entry. Upon detection of the hit, predecoder 112 begins predecoding at the byte indicated in byte field 120 or at the byte indicated by the fetch address, whichever is greater. In alternative embodiments, predecoder 112 may select a prefetch buffer to be predecoded when predecoder 112 is idle. For example, predecoder 112 may select the predecode buffer storing the most recently fetched of the cache lines within the predecode buffers and continue predecoding the instruction bytes therein. Upon completing predecode of the selected entry, the next-most-recent entry may be predecode, etc.

FIG. 5 illustrates the information stored in instruction data prefetch buffers 114 as well. A set of packet valid bits 124A–124D is included. Each packet valid bit corresponds to one of the packets within the cache line. When the corresponding signal upon packet bus 72 is asserted, the packet valid bit 124A–124D is set and the instruction bytes received upon instruction bytes bus 66 are stored into the corresponding instruction packet field 126A–126D. Additionally, the replacement column selected by external interface unit 36 and conveyed upon replacement column bus 74 is stored in a column field 128.

Figure 6:
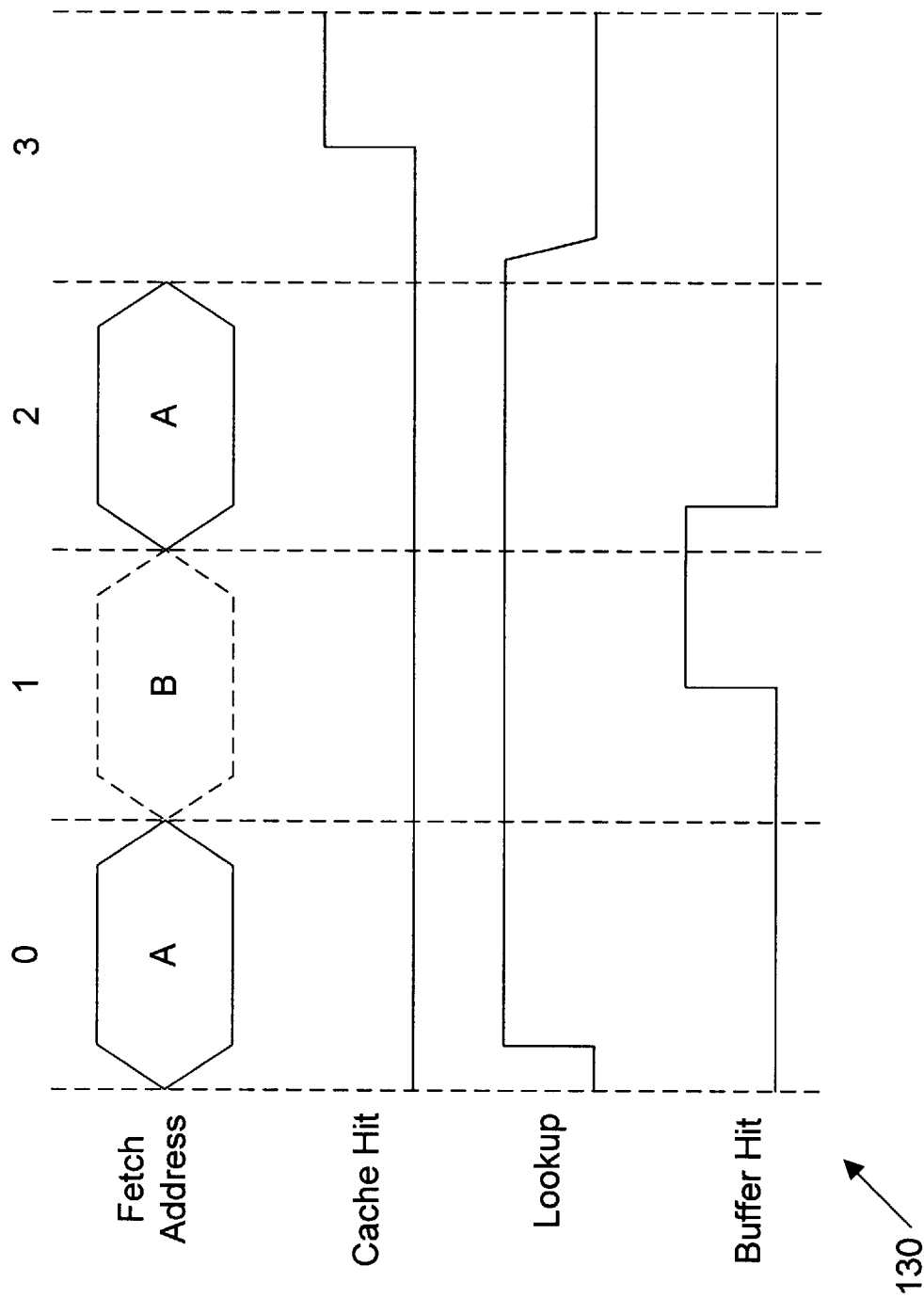
FIG. 6 is a timing diagram of a fetch hit in a prefetch buffer shown in FIGS. 4 and 5 according to one embodiment of the microprocessor shown in FIG. 1.

Turning now to FIG. 6, an exemplary timing diagram 130 illustrating a hit in the prefetch buffer is shown. In timing diagram 130 as well as other timing diagrams shown below, clock cycles are shown divided by vertical dashed lines. The clock cycles are numbered for reference.

The fetch addresses searched in instruction cache 16 and conveyed upon fetch address 50 are shown in timing diagram 130, as well as the cache hit/miss value for each request, the value of the lookup signal, and a signal from buffer hit bus 54. During clock cycle 0, a fetch address "A" is conveyed. The embodiment of microprocessor 10 corresponding to timing diagram 130 and the other timing diagrams below employs way prediction and the actual cache hit/prefetch buffer hit is not determined until the succeeding clock cycle. During clock cycle 1, a cache hit is not detected but a buffer hit is detected (as indicated by the logical high shown on the buffer hit line). Additionally during clock cycle 1, a fetch address "B" may be presented. However, the fetch for address "B" is cancelled when the cache miss of address "A" is detected during clock cycle 1.

Due to the detection of the buffer hit during clock cycle 1, the instruction bytes stored in the indicated instruction data prefetch buffer and the corresponding predecode data is transmitted to instruction cache 16 for storage. Subsequently, instruction cache 16 reaccesses the instruction array and detects a cache hit. For example, during clock cycle 2 of timing diagram 130, address "A" is fetched and a cache hit is detected during clock cycle 3. It is noted that, according to one embodiment, a clock cycle may be inserted between clock cycles 1 and 2 as shown in FIG. 6. The clock cycle is used to update the instruction array within instruction cache 16 with the instruction bytes from the prefetch buffers.

Figure 7:
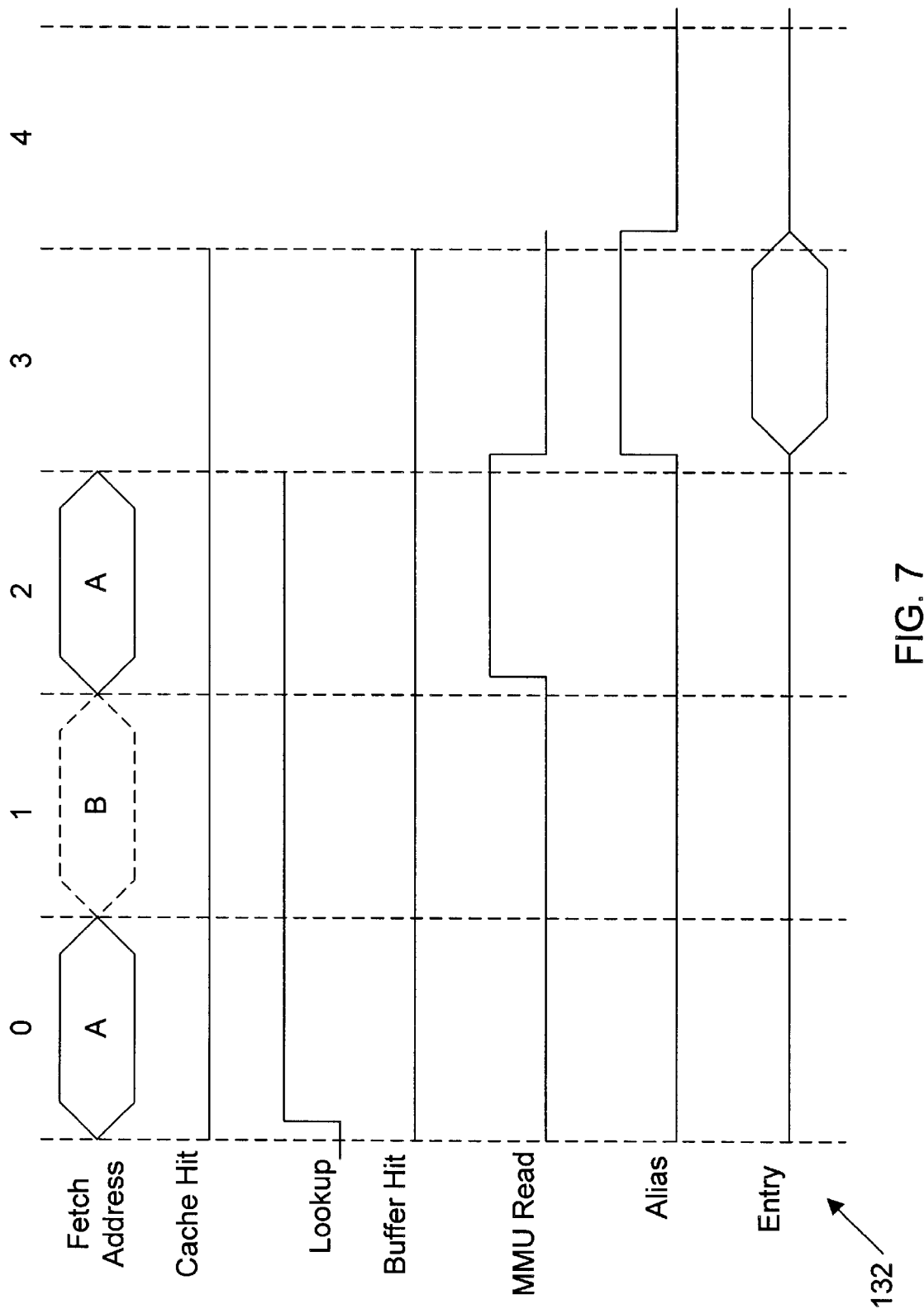
FIG. 7 is a timing diagram of a fetch hit in the prefetch buffer which is an address alias.

Turning next to FIG. 7, a timing diagram 132 is shown depicting detection of an alias for a fetch address, where the alias is stored in the prefetch buffers. Similar to timing diagram 130, a fetch address "A" is presented in clock cycle 0 and is determined to miss in clock cycle 1. For timing diagram 132, a cache miss (as indicated by the logical zero on the cache hit signal) and a prefetch buffer miss (as indicated by the logical zero on the buffer hit line) is detected. Therefore, during clock cycle 2, fetch address "A" is presented again. The lookup signal is asserted as usual, but the MMU read signal is asserted as well. External interface unit 36 detects that the physical address formed via translation is the same as a physical address stored in the prefetch buffers with respect to a different linear address. External interface unit 36 updates the linear address field of the corresponding prefetch buffer to indicate the newly presented linear address and asserts the alias line in response (shown in clock cycle 3). Additionally, the entry in which the alias is detected is conveyed upon entry bus 70 during clock cycle 3, such that instructions from the prefetch buffer may be stored into instruction cache 16. It is noted that, although the translation is shown completing in one cycle in timing diagram 132, multiple clock cycles may be required. In particular, if a translation is not stored in TLB 104 for a given fetch address, multiple clock cycles may be required to generate the translation from the translation tables stored in main memory.

Figure 8:
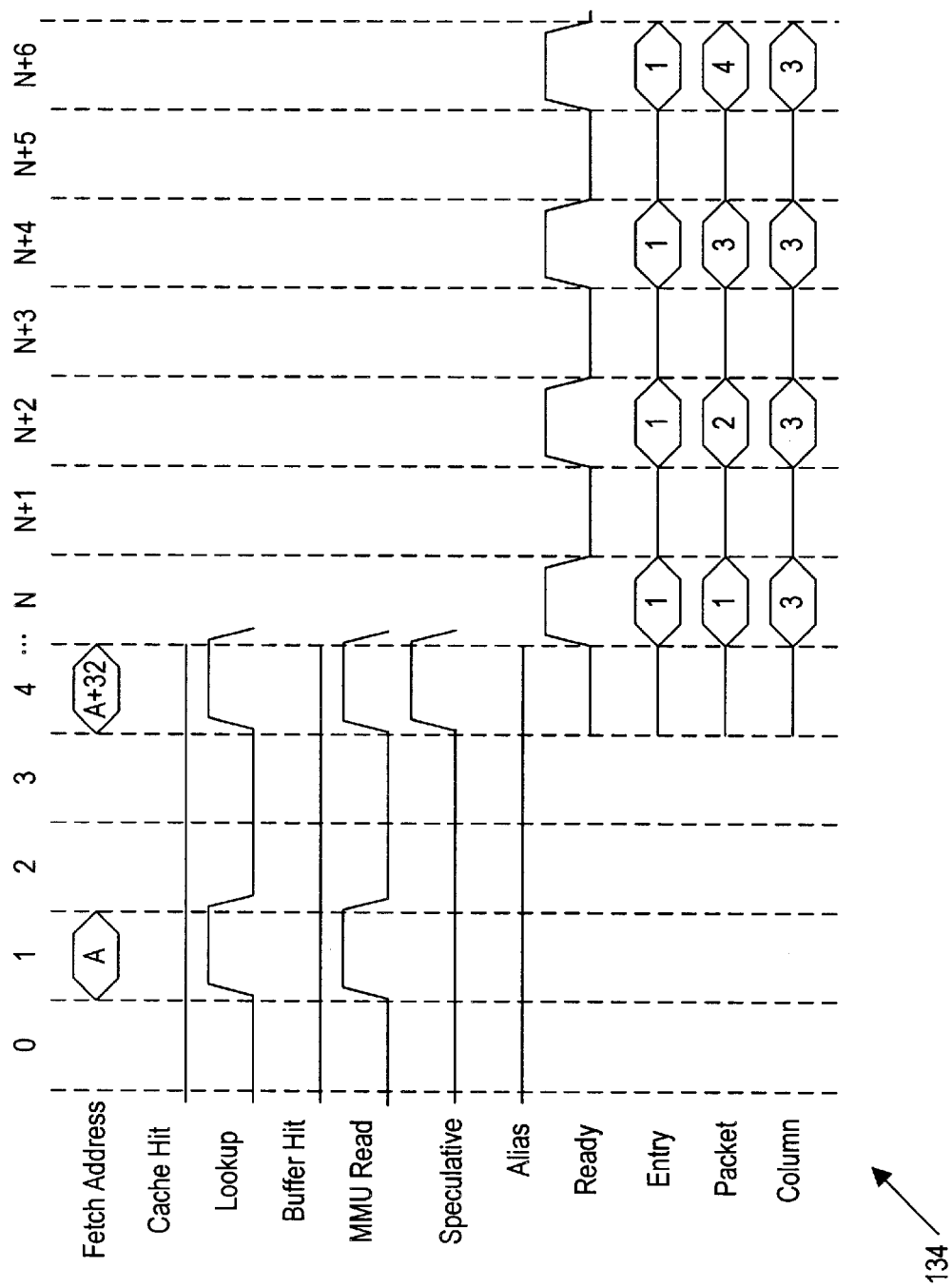
FIG. 8 is a timing diagram of a fetch miss in both the instruction cache and the prefetch buffer, followed by a prefetch buffer fill.

Turning now to FIG. 8, a timing diagram 134 depicting a prefetch buffer fill operation is shown. During clock cycle 1, a fetch address "A" which was previously determined to miss both instruction cache 16 and the prefetch buffers is presented upon fetch address bus 50. Additionally, the MMU read and lookup signals are asserted. During clock cycle 2, the alias signal is deasserted. Subsequently, a fetch to the external memory subsystem is initiated by external interface unit 36. Still further, during clock cycle 4, a fetch for the next succeeding cache line to fetch address "A" (i.e. fetch address "A"+32 in the present embodiment) is presented. The speculative signal upon speculative line 64 is asserted since the succeeding cache line fetch is speculative.

During four subsequent clock cycles, data is returned from the external main memory subsystem for the cache line including address "A". As shown in FIG. 8, data packets arrive during clock cycles "N", "N+2", "N+4", and "N+6". However, any number of clock cycles may elapse between the arrival of different data packets. Each packet is signified by assertion of the ready signal, and the entry and packet number are conveyed as well. Additionally, the replacement column selected for the cache line is conveyed. In yet subsequent clock cycles (not shown), data for the cache line including address "A"+32 is returned in a similar fashion.

Figure 9:
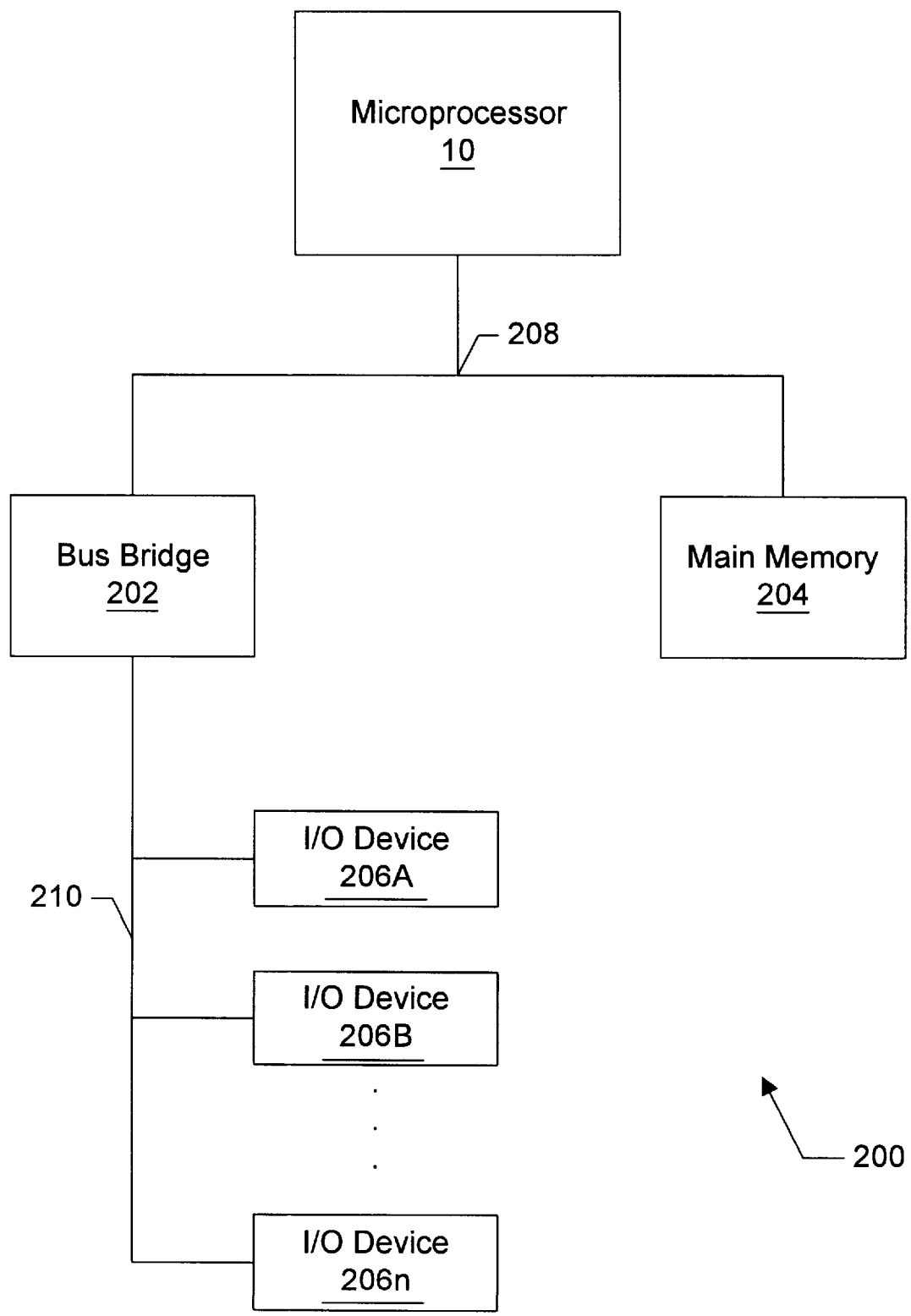
FIG. 9 is a block diagram of a computer system including the microprocessor shown in FIG. 1.

Turning now to FIG. 9, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |

TABLE 1-continued x86 Fast Path, Double Dispatch, and MROM Instructions

| X86 Instruction | Instruction Category |
|---|---|
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note:
Instructions including an SIB byte are also considered double dispatch instructions.

In accordance with the above disclosure, a microprocessor is disclosed which includes multiple prefetch buffers for storing cache lines of instructions which were fetched from an external main memory subsystem. The instruction bytes are retained in the prefetch buffers even if predecoding of the instruction bytes is interrupted to perform predecoding of other instruction bytes. Still further, the bytes are retained if instruction fetching for a different address is initiated. If the instruction bytes stored in the prefetch buffers are later fetched, the bytes may be available in the prefetch buffers. Still further, a portion or all of the predecode data may be available.

Numerous variations and modifications will become apparent to those skilled in the art once the above disclosure is fully appreciated. It is intended that the following claims be interpreted to embrace all such variations and modifications.

What is claimed is:

1. A method for prefetching, comprising:
   storing an address which misses an instruction cache in an address buffer;
   initiating an external request for instruction bytes stored at said address;
   receiving said instruction bytes into an instruction data buffer;
   predecoding said instruction bytes; and
   retaining said instruction bytes in said instruction data buffer until completion of said predecoding, even if said predecoding is interrupted.

2. The method as recited in claim 1 wherein said predecoding comprises:
   predecoding a first portion of said instruction bytes;
   storing an indication of a last one of said first portion of said instruction bytes;
   predecoding another set of instruction bytes; and
   predecoding a remaining portion of said instruction bytes.

3. The method as recited in claim 2 wherein said predecoding a remaining portion comprises checking said indication to determine a boundary between said first portion of said instruction bytes and said remaining portion of said instruction bytes.

4. The method as recited in claim 1 further comprising discarding said instruction bytes if other instruction bytes are requested from external memory and said instruction bytes are less recent than the additional instruction bytes stored in said instruction data buffer.

5. The method as recited in claim 1 further comprising receiving a fetch address being concurrently searched within said instruction cache.

6. The method as recited in claim 5 further comprising comparing said fetch address to said address.

7. An instruction buffer for storing instructions prior to their storage in an instruction cache of a microprocessor, comprising:

an address buffer configured to store an address corresponding to a plurality of instruction bytes;

an instruction data buffer configured to store said plurality of instruction bytes, wherein said instruction data buffer is coupled to receive said plurality of instruction bytes from a source external to said microprocessor;

a control unit coupled to said instruction data buffer, wherein said control unit is configured to retain said plurality of instruction bytes within said instruction data buffer if an instruction fetching mechanism within said microprocessor initiates an instruction fetch for a second address dissimilar from said address stored in said address buffer; and a second control unit coupled to said address buffer, wherein said second control unit is coupled to receive a fetch address from said instruction cache, and wherein said instruction cache is concurrently searching for instruction bytes corresponding to said fetch address.

8. The instruction buffer as recited in claim 7 further comprising a predecode data buffer configured to store predecode data corresponding to said plurality of instruction bytes, wherein said predecode data is generated by a predecoder within said microprocessor.

9. The instruction buffer as recited in claim 8 wherein said predecode data buffer additionally stores an indication of which one of said plurality of instruction bytes is next to be predecoded by said predecoder.

10. The instruction buffer as recited in claim 9 wherein said indication is used by said predecoder to continue predecoding said plurality of instruction bytes after said predecoder is interrupted to predecode another plurality of instruction bytes.

11. The instruction buffer as recited in claim 8 wherein said control unit is further configured to transmit said plurality of instruction bytes and said predecode data to said instruction cache for storage.

12. The instruction buffer as recited in claim 11 wherein said control unit is further configured to discard said plurality of instruction bytes from said instruction data buffer upon transmittal to said instruction cache.

13. The instruction buffer as recited in claim 12 wherein said address buffer discards said address concurrent with discard of said plurality of instruction bytes.

14. The instruction buffer as recited in claim 7 wherein said second control unit is configured to compare said fetch address to said address, and wherein said second control unit is further configured to convey a buffer hit signal to said control unit in response to said comparison.

15. The instruction buffer as recited in claim 14 wherein said control unit is configured to convey said plurality of instruction bytes from said instruction data buffer to an instruction processing pipeline of said microprocessor upon receipt of an asserted buffer hit signal, and further configured to convey said plurality of instruction bytes from said instruction data buffer to said instruction cache for storage therein upon receipt of an asserted buffer hit signal.

16. A microprocessor comprising:

an instruction cache configured to store instructions;

a prefetch/predecode unit coupled to receive a plurality of instruction bytes from an external source in response to a fetch miss in said instruction cache, wherein said prefetch/predecode unit is configured to retain said plurality of instruction bytes if said instruction cache fetches an address indicative of another plurality of instruction bytes; and an external interface unit coupled to said instruction cache and said prefetch/predecode unit, wherein said external interface unit is configured to store an address corresponding to said plurality of instruction bytes and to compare said address to a fetch address being concurrently searched within said instruction cache, and wherein said prefetch/predecode unit conveys said plurality of instruction bytes to an instruction processing pipeline of said microprocessor if said address matches said fetch address.

17. The microprocessor as recited in claim 16 wherein said prefetch/predecode unit predecodes said plurality of instruction bytes, and wherein said plurality of instruction bytes are stored into said instruction cache upon completion of the predecoding.

18. The microprocessor as recited in claim 17 wherein said prefetch/predecode unit is further configured to convey said plurality of instruction bytes to said instruction cache for storage upon detection of said address matching said fetch address.

19. The microprocessor as recited in claim 18 wherein said prefetch/predecode unit is configured to retain said plurality of instruction bytes if one or more of said plurality of instruction bytes are not valid upon conveying said plurality of instruction bytes to said instruction cache for storage.

\* \* \* \* \*